United States Patent [19]

Demmer et al.

[11] Patent Number: 5,618,418
[45] Date of Patent: Apr. 8, 1997

[54] DEAD-END MEMBRANE ADSORBERS

[75] Inventors: Wolfgang Demmer, Göttingen; Hans-Heinrich Hörl, Bovenden; Dietmar Nussbaumer; Abdul R. Weiss, both of Göttingen, all of Germany

[73] Assignee: Sartorius AG, Gottingen, Germany

[21] Appl. No.: 525,311

[22] Filed: Sep. 7, 1995

[30] Foreign Application Priority Data

Sep. 14, 1994 [DE] Germany ............... 44 32 628.9

[51] Int. Cl.⁶ .................................................. B01D 64/02
[52] U.S. Cl. ................ 210/232; 210/321.61; 210/321.84
[58] Field of Search ........................... 210/321.84, 351, 210/450, 232, 321.61, 502.1

[56] References Cited

U.S. PATENT DOCUMENTS 4,895,806  1/1990  Le et al. .
5,342,517  8/1994  Kopf ........................... 210/34.84 X Primary Examiner—Frank Spear
Attorney, Agent, or Firm—Chernoff, Vilhauer, McClung & Stenzel

[57] ABSTRACT

A dead-end filtration unit without a housing comprising at least one filter cassette, each cassette comprising a plurality of laminar sections of porous adsorptive membrane, which have been rendered fluid-impermeable on their peripheries, the cassettes being sealingly compressed between two filter retainers fitted with feed inlet and permeate outlet and wherein the laminar sections are made of the same or different membrane adsorber types.

7 Claims, 4 Drawing Sheets a     b     c

DEAD-END MEMBRANE ADSORBERS

BACKGROUND OF THE INVENTION

The invention concerns a dead-end filtration unit for the selective separation of fluid substances with porous membrane adsorbers. The unit is useful for the selective separation and purification of materials which exhibit a specific affinity for adsorption such as heavy metals, bio-specific molecules, proteins, enzymes and ionized substances, and finds application in the fields of biotechnology, genetics, environmental clean-up, pharmaceuticals, analytical chemistry as well as in the food and drink industries.

According to PCT Patent Application No. 92/00805, porous adsorber membranes are such membranes as carry on their surface functional groups, ligands or reactants, which are interactive with at least one substance which is in contact with them in the fluid phase. Transport of the fluid phase through the membrane is by convection. The term "membrane adsorber" is understood in the art as a general term for membrane ion exchangers, ligand membranes and activated membranes. These in turn are subdivided according to their functional groups, ligands and reactants.

U.S. Pat. No. 4,895,806 discloses a filtration unit for the separation of molecular components from fluid mixtures by membrane adsorbers, comprising a housing, a plurality of membrane discs separated into groups by washers, with the entire membrane disc assembly being compressed between compression rings, wherein the peripheries of the compression rings and washers are in contact with the wall of the housing so as to provide a seal to prevent leakage between the membranes and the housing wall. The disadvantages of such a design are (1) when a smaller number of membrane adsorber discs are used, the unit's adsorption capacity is too low, and (2) when a greater number of membrane discs are used, the unit suffers from an exponentially restricted flow rate, even at higher pressures. A further disadvantage is that, because of the relative permanency of the seal, the membrane adsorber type within the housing is unchangeable and the user of that type of filtration unit cannot separate different materials with a single filtration unit during a single filtration run.

Important objects of the present invention include the provision of a dead-end membrane adsorber filtration unit characterized by a minimal dead volume, by a capability for scale-up, and that has the capability of simultaneous separation of different materials during a single filtration run. These objects and others that will become apparent to one of ordinary skill are achieved by the dead-end membrane adsorber filtration unit of the present invention which is summarized and described in detail below.

SUMMARY OF THE INVENTION

The present invention comprises a plurality of layered, laminar sections of porous membrane adsorber of the same or different types which are compressed between two filter retaining means, wherein the laminar sections are fluid-impermeable at their circumferential edges. In a particularly preferred embodiment, the plurality of the laminar sections are combined into filter cassettes.

BRIEF DESCRIPTION OF THE DRAWINGS

FIG. 5b is a perspective view of the cassette shown in FIG. 5a.

DETAILED DESCRIPTION OF THE INVENTION

The fabrication of fluid-impermeable edges on membrane adsorbers is known (see, for example, German Patent Nos. 41 14 611, 38 03 341 and 34 48 391), and may be accomplished by thermal or chemical treatment or by coating or by a combination of all three such methods. The fluid-impermeable edge prevents radial leakage of the medium to be filtered. When a filter pack comprising a plurality of membrane adsorber laminar sections with fluid-impermeable edges are compressed between two retainers, one of which carries a feed inlet and the other a permeate discharge port, it is possible to filter axially through the filter pack without the necessity of a housing. By varying the number of sections of layered, porous membrane adsorbers, the dead-end filtration unit of the present invention may be fabricated into modular components and its adsorption capacity may be custom-engineered to meet the particular requirements of the filtration. Moreover, it is possible, by the use of sections of different membrane adsorber types during a filtrations run, to selectively adsorb different substances on each type of membrane, and to thereafter selectively elute, and thereby recover, the different filtered substances. Desorption of the materials separated may be effected separately without dismantling of the filtration unit of the single membrane adsorber types. Advantageously, the sections of different membrane adsorber types are tagged by type, e.g., by color- or shape-coding.

In a preferred embodiment a plurality of laminar sections of layered porous membrane adsorber are pressed together to form filter cassettes. In the modular, stackable, and interlockable filter cassettes the laminar sections are encased, saturated with the desired chemically activating solution, and made fluid-tight at their edges by a durable elastic sealant. Each filter cassette contains a plurality of laminar porous membrane adsorber sections, with the same or different adsorptive properties with preferably up to 100 sections. The form and size of the sections is optional and in practice can be made to conform to commercially available end plate filter retainers.

As necessitated by particular filtration application, a dead-end filtration unit of the present invention may be assembled from a combination of different filter cassettes.

The present invention offers extreme flexibility in that, by qualitative and quantitative choice of membrane types, filtration units may be custom-engineered to meet the qualitative and quantitative demands of any given filtration application and thereby accomplish simultaneous separation of various materials during a single filtration run. This leads to savings in investment, energy and work time while at the same time minimizing loss of the valuable materials being treated.

Figure 1:
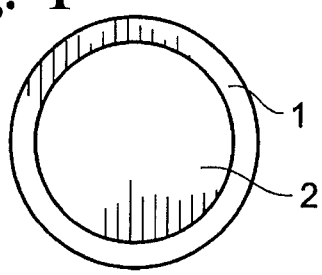
FIG. 1 is a plan view of a laminar section of a porous membrane adsorber of the present invention having a fluid-impermeable periphery.
Figure 2:
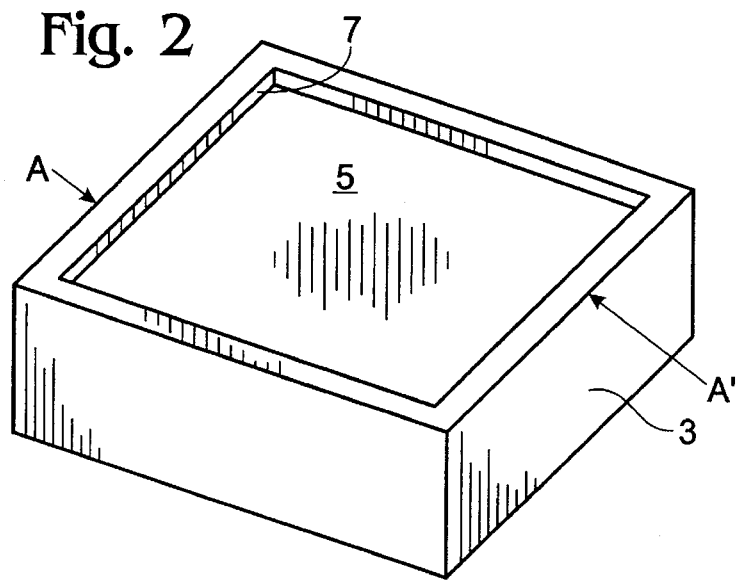
FIG. 2 is a perspective view of an exemplary rectilinear filter cassette of the present invention.

Referring to the drawings, there is shown in FIG. 1, the fluid-impermeable peripheral zone 1 of a stackable, laminar section of a porous membrane adsorber 2. The stackable, modular, and interconnectable filter cassettes shown in FIGS. 2–6 comprise layered, laminar sections of porous membrane adsorber 2. The edges of said sections are coated with a durable elastic sealant 3 and are encapsulated thereby. Each filter cassette contains a plurality of laminar sections of porous membrane adsorbers, preferentially up to 100 sections. The shape and the size of the sections are optional, but are preferably round (FIGS. 1, 5 and 8), square (FIGS. 2, 3 and 7), or polygonal to accommodate commercially available filter retainers 4. The first and last section of each cassette comprises a grate 5 which protects the membrane adsorber sections and functions both as a distributor for the feed fluid and as a collection means for the filtrate.

Figure 4:
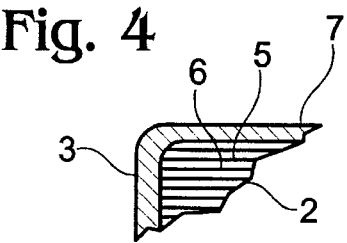
FIG. 4 is a section taken vertically to section line A—A' of FIG. 2.

As FIG. 4 shows, the durable, elastic sealant 3 overlaps the edges 6 of the membrane adsorber sections 2 in both axial and radial directions. It is applied thinly to the rim surfaces of the first and last sections (which are parallel), preferentially less than 100 μm on the surface of the section. Upon the compression of the filter cassette between the two filter retainers 4, an excess 7 of sealant forms a pressed seal between the filter cassette and the filter retainer which prevents radial bypass leakage from the filtration unit.

Figure 7:
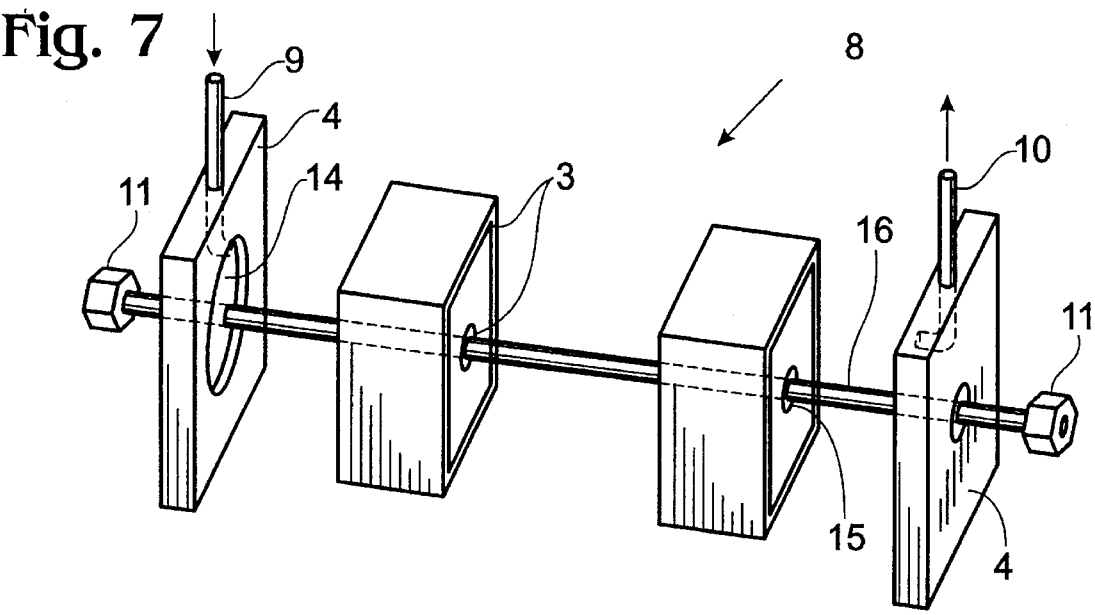
FIG. 7 is a perspective exploded view of another exemplary embodiment of the present invention having multiple filtration cassettes.
Figure 8:
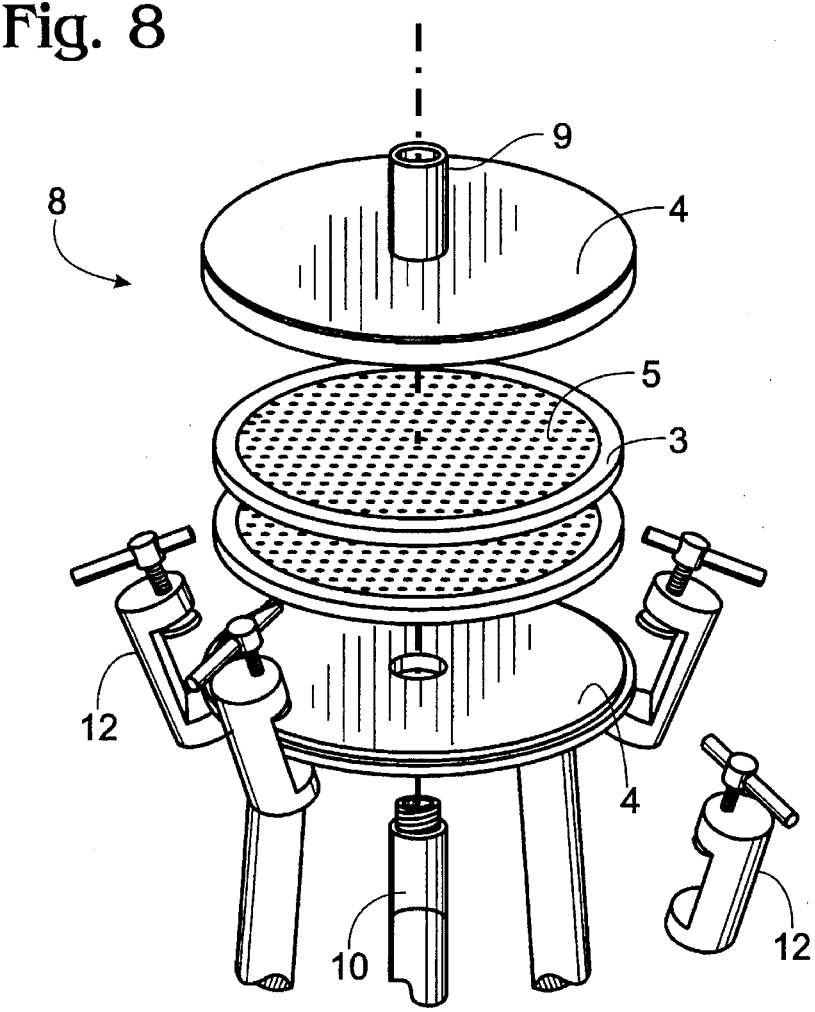
FIG. 8 is a perspective exploded view of another exemplary embodiment of the present invention having multiple filtration cassettes.
Figure 9:
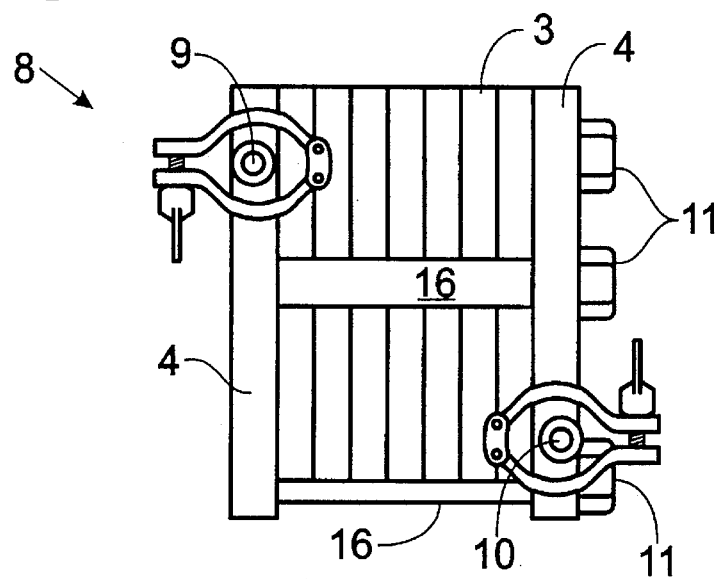
FIG. 9 is a side view of another exemplary of the present invention.

FIGS. 7, 8 and 9 show alternative embodiments of dead-end filtration units 8, each having a plurality of filter cassettes compressed between filter retainers 4. Filter retainers 4 may be provided with fittings for fluid feed inlet 9 and permeate outlet 10. Clamping pressure is provided by conventional means, such as screws 11, closure clamps 12 or by a hydraulic press (not shown). Filter retainer 4, preferably the retainer on the inlet side, may be equipped with communicating channels 14 (FIG. 7) for improved fluid distribution. The dead-end filtration unit 8 may be designed so as to accommodate analytical measuring equipment, for example, an HPLC unit, e.g., by attachment to fluid inlet 9 and permeate outlet 10 (not shown).

Figure 6:
FIG. 6 is a schematic view of two possible filter cassette designs of the present invention having sections of different membrane adsorber types.
Figure 6:
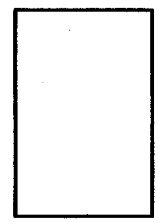
Figure 6:
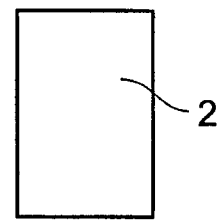
Figure 6:
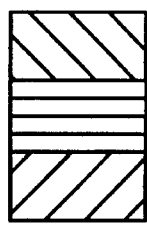
Figure 6:
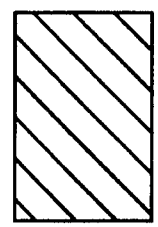
Figure 6:
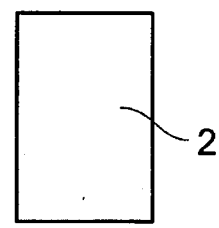

As seen in FIG. 6, the filter cassettes comprise sections of porous membrane adsorber of the same (FIG. 6c) or different membrane adsorber types (FIGS. 6a, 6b). In this way, different membrane types may be used in a single cassette (FIG. 6a). Through combinations of different variants of filter cassettes, a broad manifold of dead-end filtration units 8 for quite disparate separation tasks may be fabricated. The same effect may be attained through the use of a multiplicity of laminar sections of varying membrane adsorber types and combinations thereof.

Figure 3:
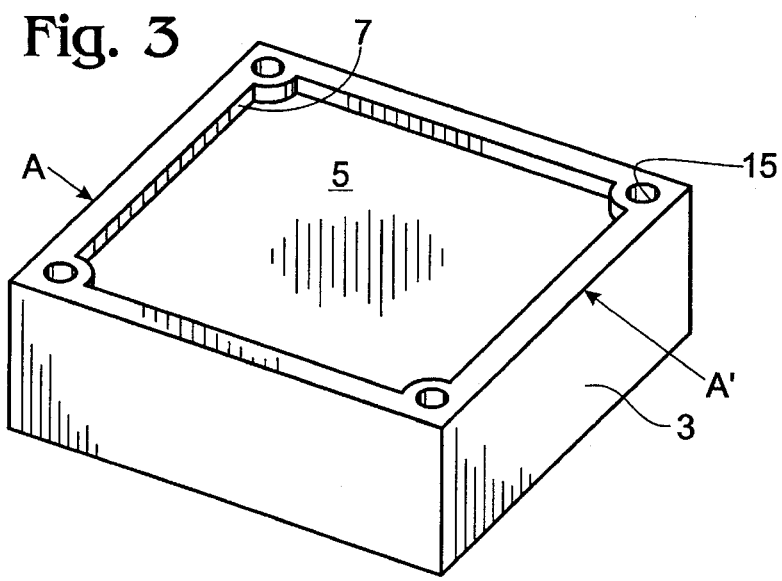
FIG. 3 is a perspective view of an alternative embodiment of an exemplary rectilinear filter cassette of the present invention.
Figure 5:
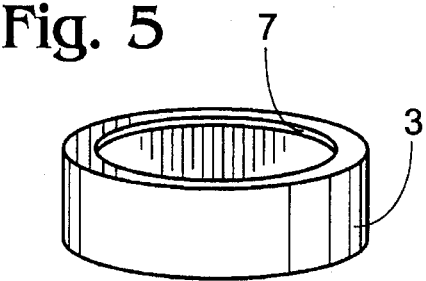
FIG. 5 is a perspective view of an exemplary cylindrical filter cassette of the present invention.
Figure 5A:
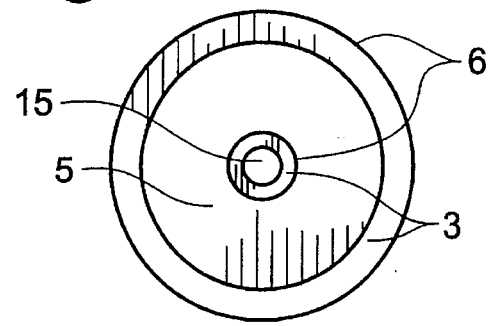
FIG. 5a is a plan view of an alternative embodiment of a cylindrical filter cassette of the present invention.
Figure 5B:
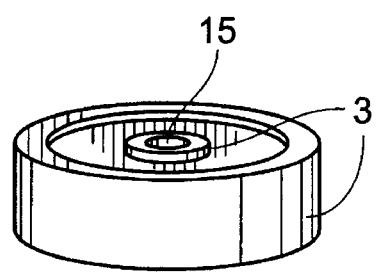

As seen in FIGS. 3, 5 and 7, openings 15 may be provided within the durable, elastic sealant material 3 for the insertion of tie rods 16 generally parallel to the direction of feed flow, which rods secure filter retainers 4.

Because of their symmetric method of construction, the dead-end filtration units 8 of the present invention may be advantageously operated or back-washed in both flow directions, without risking damage or destruction of membrane adsorber laminar sections 2 or the filter cassettes. The filtration unit shown in FIG. 8 is adaptable to the very tight compression of a plurality of laminar sections.

Figure 10:
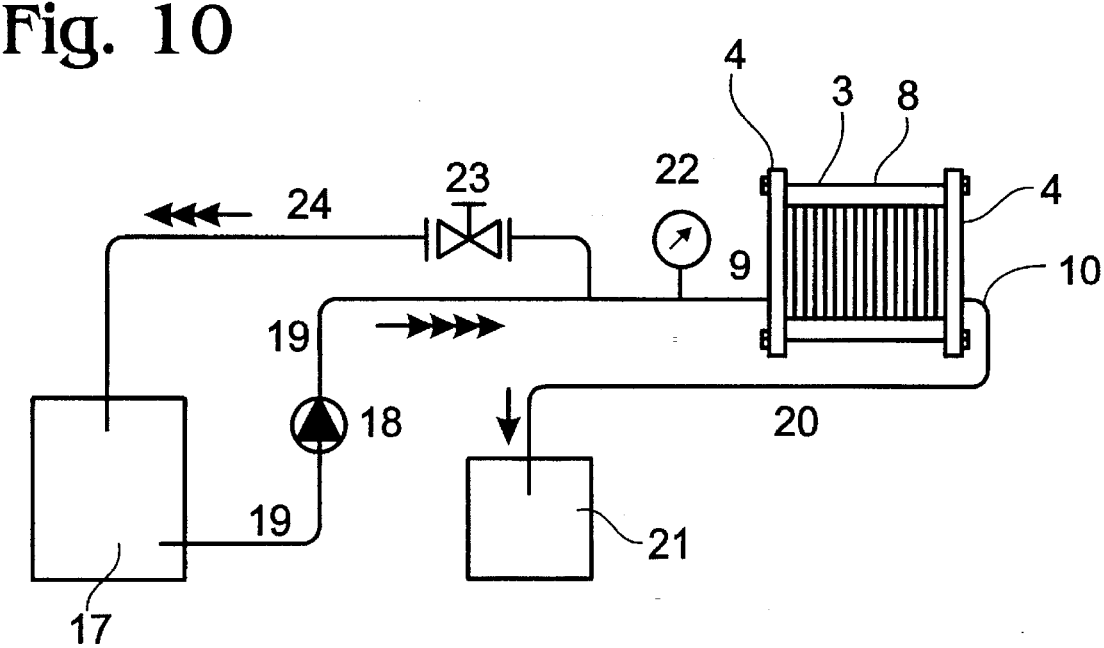
FIG. 10 is a schematic drawing of a filtration system using a filtration unit in accordance with the invention.

In FIG. 10, a filtration system is depicted schematically with a dead-end filtration unit 8 of the present invention, the unit being capable of the simultaneous separation and recovery of valuable substances of differing or like characteristics, ranging from diluted to concentrated volumes and on scales ranging from that suitable for research to that suitable for production. Between the filter retainers 4 of the dead-end filtration unit are compressed a multiplicity of filter cassettes. Feed tank 17, containing the fluid to be filtered, is in fluid communication with the filtration unit 8 via fluid feed inlet 9 by means of pump 18 and conduit 19. On the discharge side, filtration unit 8 is in fluid communication with permeate collection tank 21 through permeate discharge 10 and conduit 20. Between pump 18 and fluid feed inlet 9 is a manometer 22, as well as a valve 23 and a bypass 24 for control of the pressure of the feed delivered to filtration unit 8.

Referring to FIG. 10, in order to filter with the device of the present invention, the fluid to be filtered, carrying the substances to be separated, is pumped out of feed tank 17 by pump 18 through conduit 19 and fluid feed inlet 9 and delivered to a series of filter cassettes. The fluid now flows sequentially by convection through the sections of the porous membrane adsorber of the filter cassettes. In accord with the specific adsorption properties of each set of membrane adsorbers in each cassette, the individual substances to be separated are adsorbed in the appropriate filter cassettes. The permeate, freed from the separated substances, is conducted to permeate collection tank 21 via permeate discharge 10 and conduit 20. Utilizing appropriate means of solution, the adsorbed substances in the individual filter cassettes are selectively desorbed and eluted, then collected in an eluate-receiving tank. If selective desorbing and solution is not possible, the dead-end filtration unit 8 is opened, the filter cassettes removed according to membrane adsorber type, and a separate solution may be undertaken in accord with the particular membrane adsorber type.

EXAMPLE 1

A protein mixture of 0.5 mg Cytochrome C (SIGMA, Deisenhofen) and 0.5 mg Lactate Dehydrogenase (LDH) from beef heart (SERVA, Heidelberg) with 0.01M potassium phosphate buffer at pH 7 (KPi) was pumped through a dead-end filtration unit of substantially the same design shown in FIG. 8 which contained two filter cassettes, each with 10 sections of porous membrane adsorbers of 5 cm diameter with Reactive Blue 2 as the adsorbing ligand. Both proteins were quantitatively adsorbed, as analysis of the discharged permeate demonstrated. For selective elution of the proteins, 20 ml of the KPi buffer at a gradient of 0 to 1M sodium chloride in KPi for every 40 ml was pumped through the unit and volumes of 4 ml each taken as samples and analyzed for the presence of Cytochrome C and LDH. The results are presented in the following table, demonstrating that a sharp separation of the two proteins was achieved.

| Sample No. | Cytochrome ($E_{420\ nm}$) | LDH (units/ml) |
| --- | --- | --- |
| 1 | 0 | 0 |
| 2 | 0 | 0 |
| 3 | 0 | 0 |
| 4 | 0.05 | 0 |
| 5 | 0.3 | 0 |
| 6 | 0.4 | 0 |
| 7 | 0.16 | 0 |
| 8 | 0.08 | 0 |
| 9 | .014 | 0 |
| 10 | 0 | 0.07 |
| 11 | 0 | 0.11 |
| 12 | 0 | 0.24 |
| 13 | 0 | 0.84 |
| 14 | 0 | 3.1 |
| 15 | 0 | 3.2 |
| 16 | 0 | 2.4 |
| 17 | 0 | 1.7 |
| 18 | 0 | 1 |
| 19 | 0 | 0.04 |
| 20 | 0 | 0.01 |

EXAMPLE 2

A solution of 1.6 mg γ-globulin from beef (SERVA) and 3 mg Cytochrome C in 10 ml 0.01M sodium acetate buffer of pH 5 with a flow rate of 5 ml/min was pumped through a dead-end filtration of substantially the same design shown in FIG. 8 with each of the two filter cassettes having 10 sections of porous membrane adsorbers of 5 cm diameter which contained strongly acidic ion exchange groups (Sartobind S® Sartorius AG). Following filtration, simultaneous elution for both proteins was carried out with 20 ml 0.05M tris-HCl of pH 8 for the Cytochrome C and 20ml M sodium carbonate buffer for the γ-globulin. Recovery of both proteins by a single elution pass was quantitative.

EXAMPLE 3

A protein mixture of 5 mg LDH from pork muscle (SERVA), 5 mg beef serum albumen (BSA) and 5 mg Cytochrome C (both SIGMA) in 0.01M sodium carbonate buffer with pH 9.5 was pumped through a dead-end filtration of substantially the same design shown in FIG. 8, except that it had three filter cassettes, each 5 cm in diameter, one cassette of which consisted of three sections with strongly acidic ion exchange groups (Sartobind S®), another of which consisted of three sections of porous membrane adsorber with strongly basic ion exchange groups (Sartobind Q®, Sartorius AG), and the third consisting of 5 sections of porous membrane adsorber with Reactive Blue 2 the adsorptive ligand. Analysis of the discharged permeate showed that all three proteins were quantitatively adsorbed. The LDH and BSA were adsorbed on the membrane of the strongly basic adsorber cassette, while the Cytochrome C was picked up on the membrane of the strongly acid adsorber cassette. Thereafter, 20 ml of a 0.01M potassium phosphate buffer of pH 6.5 was pumped through the dead-end filtration unit. The LDH was thereby desorbed from the strongly acidic adsorber cassette and then adsorbed onto the adsorber cassette having Reactive Blue 2 as the adsorptive ligand, while the two other proteins were not desorbed. Thereafter, the three filter cassettes were removed, and each separately clamped between filter retainers. Then, 20 ml of a solution of 1M potassium chloride in 0.01M potassium phosphate buffer at pH 7.0 was pumped through each cassette. In the discharged permeate of the strongly acidic adsorber cassette, Cytochrome C was shown to have been adsorbed, then desorbed, nearly quantitatively. Similarly, in the permeate of the strongly basic adsorber cassette as well as in the permeate of the adsorber cassette with Reactive Blue 2, LDH was analytically shown to be present. The yield was at least 92% of the amount of starting protein.

EXAMPLE 4

A protein mixture solution comprising 5 mg LDH from beef heart (SERVA), 5 mg BSA and 5 mg Cytochrome C (both SIGMA) in 0.01M sodium citrate buffer of pH 3.8 was pumped through a dead-end filtration unit of the same design used in Example 3. All three proteins were quantitatively adsorbed, as shown by an analysis of the permeate, and all three were adsorbed on the membranes of the strongly acidic adsorber cassette. Thereafter, 20 ml of a 0.01M potassium phosphate buffer at pH 7.0 was pumped through the filtration unit, causing both the selective desorption of the LDH and BSA and subsequent adsorption of these two proteins onto the membranes of the adsorber cassette having Reactive Blue 2 as the adsorptive ligand. None of the three proteins could be detected in the discharged permeate. Thereafter, 20 ml of a 0.01M potassium phosphate buffer with 5 mM Nicotinamide-Adenine-Dinucleotide (NADH) was pumped through the filtration unit, causing the selective desorption of the LDH from the Reactive Blue 2 cassette and subsequent adsorption onto the membranes of the strongly basic adsorber cassette. Again, none of the three proteins could be detected in the permeate. Thereafter, 20 ml of a 0.01M sodium citrate buffer at pH 3.8 was pumped through the filtration unit, causing elution of only the LDH.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A dead-end filtration unit having no housing and comprising:

(a) at least one modular filter cassette, each cassette comprising a plurality of laminar sections of porous adsorptive membrane, each laminar section of which has been rendered fluid-impermeable impermeable on its periphery and is encased at its periphery; with every other laminar section in said cassette by a durable elastic sealant wherein said durable elastic sealant overlaps said cassette on its periphery in both axial and radial directions; and (b) two filter retainers having fittings for fluid feed inlet and permeate outlet, said retainers being adapted for retaining said at least one modular filter cassette in a fluid-tight connection.

2. The filtration unit of claim 1 wherein said at least one filter cassette contains holes in its periphery through said durable elastic sealant for axial insertion of aligning rods.

3. The filtration unit of claim 2 wherein said aligning rods are secured to said filter retainers.

4. The filtration unit of claim 1 having a plurality of said filter cassettes wherein each filter cassette has the same adsorptive properties.

5. The filtration unit of claim 1 having a plurality of said filter cassettes wherein each filter cassette has different adsorptive properties.

6. The filtration unit of claim 1 wherein said plurality of laminar sections of porous adsorptive membrane comprises membranes with the same adsorptive properties.

7. The filtration unit of claim 1 wherein said plurality of laminar sections of porous adsorptive membrane comprises membranes with different adsorptive properties.

* * * * *

UNITED STATES PATENT AND TRADEMARK OFFICE
CERTIFICATE OF CORRECTION

PATENT NO. : 5,618,418 Page 1 of 1
APPLICATION NO. : 08/525311
DATED : April 8, 1997
INVENTOR(S) : Demmer et al.

It is certified that error appears in the above-identified patent and that said Letters Patent is hereby corrected as shown below:

Column 4, line 40: Delete "solution" and insert -- elution --.

Column 4, line 45: Delete "solution" and insert -- elution --.

Signed and Sealed this

Fifth Day of December, 2006

JON W. DUDAS
*Director of the United States Patent and Trademark Office*